(12) United States Patent
Ito et al.

(10) Patent No.: US 6,962,639 B2
(45) Date of Patent: Nov. 8, 2005

(54) POWER TRANSMISSION BELT AND A METHOD OF FORMING A POWER TRANSMISSION BELT

(75) Inventors: Takehiko Ito, Hyogo (JP); Toshiaki Aragane, Aichi (JP); Koji Kitahama, Kobe (JP); Syunichi Imahigashi, Aichi (JP)

(73) Assignee: Mitsuboshi Belting Ltd., Kobe (JP)

( * ) Notice: Subject to any disclaimer, the term of this patent is extended or adjusted under 35 U.S.C. 154(b) by 225 days.

(21) Appl. No.: 10/619,350

(22) Filed: Jul. 14, 2003

(65) Prior Publication Data

US 2004/0014544 A1 Jan. 22, 2004

Related U.S. Application Data

(62) Division of application No. 09/845,906, filed on Apr. 30, 2001, now Pat. No. 6,620,068.

(30) Foreign Application Priority Data

Apr. 28, 2000 (JP) ........................................ 2000-129879

(51) Int. Cl.[7] .............................. F16G 1/28; F16G 5/20
(52) U.S. Cl. ........................ 156/139; 156/137; 156/141
(58) Field of Search .................................. 156/137–142

(56) References Cited

U.S. PATENT DOCUMENTS 2,699,685 A    1/1955    Waugh
3,759,112 A    9/1973    Polshikov et al.
4,276,039 A    6/1981    Takano
4,410,314 A    10/1983   Miranti et al.
4,514,179 A    4/1985    Skura
4,702,729 A    10/1987   Tanaka et al.
4,708,703 A    11/1987   Macchiarulo et al.
4,737,138 A    4/1988    Komai et al.
5,858,147 A    1/1999    Goettsch
6,620,068 B2   9/2003    Ito et al.

FOREIGN PATENT DOCUMENTS

GB            987834 A      3/1965
JP            57-86648 A    5/1982

Primary Examiner—Sam Chuan Yao
(74) Attorney, Agent, or Firm—Wood, Phillips, Katz, Clark & Mortimer

(57) ABSTRACT

A power transmission belt having an endless body with a length, an inside, and an outside. The body has cogs on at least one of the inside and outside of the body and spaced along the length of the body so as to define alternating cog crests and cog troughs. The cog crests each have oppositely facing side surfaces with an apex between the oppositely facing side surfaces. There is a reinforcing fabric on the at least one of the inside and outside of the body. The reinforcing fabric has first and second spaced end portions with a first free end at the first end portion and a second free end at the second end portion. The first and second end portions overlap so that the first and second free ends are each at a side surface on a cog crest.

24 Claims, 6 Drawing Sheets

POWER TRANSMISSION BELT AND A METHOD OF FORMING A POWER TRANSMISSION BELT

CROSS-REFERENCE

This application is a division of Ser. No. 09/845,906, filed Apr. 30, 2001 now U.S. Pat. No. 6,620,068 entitled "Power Transmission Belt and Method of Forming a Power Transmission Belt".

BACKGROUND OF THE INVENTION

1. Field of the Invention

This invention relates to power transmission belts having cogs spaced along their length on at least one side thereof and having a reinforcing fabric over the cogs. The invention is also directed to a method of forming a belt of this type.

2. Background Art

Cog belts are used on a wide range of machinery and in a wide range of environments. Commonly, these belts are used on systems with variable speed transmissions, such as on snowmobiles, scooters, buggies, and other different types of equipment. These systems may use a drive and driven pulley combination, wherein speed variation is effected by varying the effective diameter of the pulleys.

A typical belt in this environment has a compression rubber layer, a tension rubber layer, cogs with cog troughs and crests alternating along the length of the belt in at least the compression layer, and at least one load carrying cord embedded in a cushion rubber layer. These belts are commonly referred to commercially as raw edge single cog belts or raw edge double cog belts.

In a typical manufacturing process for this type of belt, an unvulcanized rubber sheet, having a length greater than the desired length of the completed belt, is pressed against a plain cogged mold, having alternating grooves and projections, with the rubber heated and under pressure, to form a cog pad. The resulting cog pad has cogs spaced lengthwise at a constant pitch and may have one or more plies of reinforcing fabric thereon. The cog pad is placed on a cylindrical matrix installed on a molding drum having grooves and projections thereon, so that the cog pad meshes with the cylindrical matrix. The cog pad is cut and its ends butt-joined. Load carrying cords are wound around the cog pad followed by another rubber layer and at least one layer of reinforcing fabric. The resulting belt sleeve is then vulcanized.

Typically, the cog pad is cut to length by skilled workers that manually count the number of cogs necessary to produce the desired end belt length and mark a cog trough in chalk where a cut is to be made to produce the desired belt length. The cog pad is severed at cogs at both ends using a cutter.

The unvulcanized rubber sheet is exposed by separating the reinforcing fabric at one end of the cog pad. The reinforcing fabric at the other end of the cog pad is processed to protrude from the other end of the cog pad. The cog pad is then wound around a matrix with grooves and projections and the ends of the rubber layer are butt-joined. The ends of the reinforcing fabric are joined in overlapping relationship. The cog pad is ultimately vulcanized.

However, as seen in FIG. 10, manufacture by this method may result in flaws in the form of creases 10 in reinforcing fabric 11 on the exemplary cog belt 12 shown. The crease 10 is developed at a trough 14 between crests 16 on adjacent cogs 18. At a joint 20 produced by an overlying fabric end portion 22 and an underlying fabric end portion 24, the overlying fabric end portion 22 tends to attract the underlying fabric end portion 24 in the region of the trough 14 during vulcanization. This is attributable to the lack of rubber at the joint 20 in the region of the trough 14. As the belt 12 is operated and the trough 14 is repeatedly bent, cracks may develop at an early stage in the belt life at the trough 14 where the crease 10 is located. This crack may grow and ultimately cause failure of the belt 12.

SUMMARY OF THE INVENTION

In one form, the invention is directed to a power transmission belt having an endless body with a length, an inside, and an outside. The body has cogs on at least one of the inside and outside of the body and spaced along the length of the body so as to define alternating cog crests and cog troughs. The cog crests each have oppositely facing side surfaces with an apex between the oppositely facing side surfaces. There is a reinforcing fabric on the at least one of the inside and outside of the body. The reinforcing fabric has first and second spaced end portions with a first free end at the first end portion and a second free end at the second end portion. The first and second end portions overlap so that the first and second free ends are each at a side surface on a cog crest.

In one form, the first and second free ends are each at one of the side surfaces on a first cog.

In one form, the first and second free ends are at the same side surface on the first cog.

In one form, the body has a compression rubber layer and a tension rubber layer and the cogs are formed in at least the compression rubber layer.

In one form, the body comprises at least one cushion rubber layer and at least one load carrying cord embedded in the cushion rubber layer.

In one form, the cogs are formed in a rubber layer, the rubber layer has ends which are mated at a joint, and the joint is at a cog crest.

In one form, the free ends are each at a side surface on a first cog crest and the ends of the rubber layer are mated at the first cog crest.

In one form, the joint is formed at a line and one of the first and second free ends is aligned with the line of the joint.

In one form, there are cogs on the other of the inside and outside of the body that are spaced along the length of the body so as to define alternating cog crests and cog troughs.

In one form, the line of the joint makes an angle with a lengthwise line through the body that is equal to 60–90°. The angle may be between 65 and 80°.

In one form, the first and second end portions are overlapped at the apex of a cog crest.

In one form, the body has a rubber layer and there are short reinforcing fibers in the rubber layer. This rubber layer may define at least part of a compression section.

In one form, there are short reinforcing fibers in the cushion rubber layer.

In one form, the reinforcing fabric consists of at least one of a) cotton fibers, b) polyester fibers, and c) nylon fibers.

In one form, the reinforcing fabric is made by one of a) plain weaving, b) twill weaving, and c) sateen weaving.

In one form, the reinforcing fabric has warp and weft yarns crossing at an angle of 90–120°.

In one form, the reinforcing fabric is treated with an RFL solution and friction coated with a rubber composition.

The invention is further directed to a method of forming a power transmission belt/belt sleeve including the steps of: placing a reinforcing fabric against an unvulcanized rubber layer; forming the reinforcing fabric and unvulcanized rubber layer against a mold surface having alternating grooves and projections to produce a cog pad having first and second spaced ends and cog crests and troughs alternating between the first and second spaced ends, each cog crest having oppositely facing side surfaces with an apex between the oppositely facing side surfaces; processing the cog pad at the first end of the cog pad so that a part of the fabric layer projects beyond the rubber layer at the first end of the cog pad; processing the reinforcing fabric at the second end of the cog pad to expose the rubber layer; joining the rubber layer at the first and second ends of the cog pad; overlapping the part of the reinforcing fabric at the first end of the cog pad with the reinforcing fabric at the second end of the cog pad so that a) a free end of the part of the reinforcing fabric at the first end of the cog pad is at a side surface on a cog crest and b) a free end of the reinforcing fabric at the second end of the cog pad is on a cog crest; and combining the cog pad with at least one additional component to define a power transmission belt/belt sleeve having a length.

The step of combining the cog pad with at least one other component may involve combining the cog pad with at least one cushion rubber layer and at least one load carrying cord extending lengthwise of the body and embedded in the cushion rubber layer.

In one form, the rubber layer is a compression rubber layer and the step of combining the cog pad with at least one other component involves combining the cog pad with a tension rubber layer.

The step of joining the rubber layer may involve placing the cog pad around a mold with alternating grooves and projections and joining the rubber layer at the first and second ends with the cog pad placed around the mold.

The method may further include the step of vulcanizing the cog pad with at least one additional component.

The method may further include the step of cutting the power transmission belt/belt sleeve to define a plurality of power transmission belts.

The method may further include the step of forming the reinforcing fabric by one of a) plain weaving, b) twill weaving, and c) sateen weaving.

The step of joining the rubber layer may involve mating ends of the rubber layer at the first and second ends of the cog pad to produce a joint at a cog crest.

The step of joining the rubber layer may involve mating ends of the rubber layer at the first and second ends of the cog pad to produce a joint line that is at an angle of 60–90° to a line extending between the first and second ends of the cog pad. The angle may be between 65 and 80°.

In one form, the free end of the part of the reinforcing fabric at the first end of the cog pad and the free end of the reinforcing fabric at the second end of the cog pad are on the same cog crest.

In one form, the free end of the part of the reinforcing fabric at the first end of the cog pad and the free end of the reinforcing fabric at the second end of the cog pad are on the same side surface on the same cog crest.

In one form, the free end of the part of the reinforcing fabric at the first end of the cog pad and the free end of the reinforcing fabric at the second end of the cog pad are on different side surfaces on the same cog crest.

The invention is further directed to a method of forming a power transmission belt including the steps of: placing a reinforcing fabric against an unvulcanized rubber layer; forming the reinforcing fabric and unvulcanized rubber layer against a mold surface having alternating grooves and projections to produce a cog pad having first and second spaced ends and cog crests and troughs alternating between the first and second spaced ends, each cog crest having oppositely facing side surfaces with an apex between the oppositely facing side surfaces; processing the cog pad at the first end of the cog pad so that a part of the fabric layer projects beyond the rubber layer at the first end of the cog pad; joining the rubber layer at the first and second ends of the cog pad; overlapping the part of the reinforcing fabric at the first end of the cog pad with the reinforcing fabric at the second end of the cog pad so that a) a free end of the part of the reinforcing fabric at the first end of the cog pad is at a side surface on a cog crest and b) a free end of the reinforcing fabric at the second end of the cog pad is on a cog crest; and combining the cog pad with at least one additional component to define a power transmission belt/belt sleeve having a length.

The step of combining the cog pad with at least one other component may involve combining the cog pad with at least one cushion rubber layer and at least one load carrying cord extending lengthwise of the body and embedded in the cushion rubber layer.

In one form, the rubber layer is a compression rubber layer and the step of combining the cog pad with at least one other layer involves combining the cog pad with a tension rubber layer.

The step of joining the rubber layer may involve placing the cog pad around a mold with alternating grooves and projections and joining the rubber layer at the first and second ends with the cog pad placed around the mold.

The method may further include the step of vulcanizing the cog pad with at least one additional component.

The method may further include the step of cutting the power transmission belt/belt sleeve to define a plurality of power transmission belts.

The method may further include the step of forming the reinforcing fabric to be flush with the second end of the cog pad.

The step of joining the rubber layer may involve mating ends of the rubber layer at the first and second ends of the cog pad to produce a joint at a cog crest.

The step of joining the rubber layer may involve mating ends of the rubber layer at the first and second ends of the cog pad to produce a joint line that is at an angle of 60–90° to a line extending between the first and second ends of the cog pad. The angle may be between 65 and 80°.

In one form, the free end of the part of the reinforcing fabric at the first end of the cog pad and the free end of the reinforcing fabric at the second end of the cog pad are on the same cog crest.

In one form, the free end of the part of the reinforcing fabric at the first end of the cog pad and the free end of the reinforcing fabric at the second end of the cog pad are on the same side surface on the same cog crest.

In one form, the free end of the part of the reinforcing fabric at the first end of the cog pad and the free end of the reinforcing fabric at the second end of the cog pad are on different surfaces on the same cog crest.

DETAILED DESCRIPTION OF THE DRAWINGS

Figure 1:
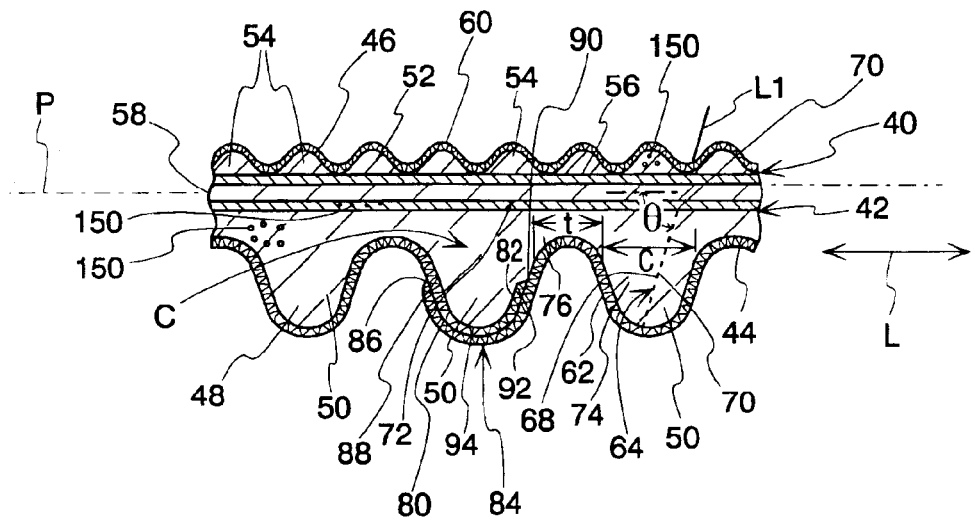
FIG. 1 is a fragmentary, cross-sectional view of one form of power transmission belt, made according to the present invention.

Referring initially to FIG. 1, one form of power transmission belt, made according to the invention, is shown at 40. It should be understood that the belt 40 is only exemplary of the many different belt constructions into which the present invention can be incorporated. For example, the components of the belt, and arrangement thereof, may be considerably different than those shown. While the belt 40 shown is a double cog belt, the invention can be similarly incorporated into a single cog belt.

The belt 40 has a body 42 with an inside 44 and an outside 46. The body 42 is made up of a compression rubber layer 48 on the inside of the body 42, in which a plurality of cogs 50 are formed and spaced at regular intervals along the length of the body 42, as indicated by the double-headed arrow L. A tension rubber layer 52 defines the outside of the body 42. The tension rubber layer 52 has a plurality of cogs 54 formed therein and spaced at regular intervals along the length of the body 42. A cushion rubber layer 56 is defined between the compression rubber layer 48 and tension rubber layer 50 and has spirally wrapped load carrying cords 58 embedded therein and extending lengthwise of the body 42. The load carrying cords 58 may be made of fiber, such as polyester fiber, aramid fiber, and/or glass fiber. A first reinforcing fabric layer 60 is applied to the outside of the body 42. A second reinforcing fabric layer 62 is applied to the inside of the body 42. The fabric layer 60 outside of the body 42 is optional.

A joint 64 is formed in the compression rubber layer 48 where ends 68, 70 of the compression rubber layer 48 are butt-joined. The ends 68, 70 are planar so that the joint has a linear extent, as indicated by the extension L1, as viewed from the belt sides. The line L1 of the joint 64 makes a bias angle θ with a lengthwise reference line in a plane P through the central axes of the load carrying cords 58. The angle θ is from 60–90°, and more preferably 65–80°. The bias arrangement of the joint 64 is desirable in that it plays a role in preventing rubber in the cushion rubber layer 56 from migrating into the joint end 70. This reduces the likelihood of crack formation at the joint 64.

To further reduce the likelihood of migration of rubber into the joint 64, it is desirable to offset the joint 64 lengthwise from a joint 72 in the cushion rubber layer 56.

The cogs 50 have crest portions 74 identified by "c" and trough portion 76 therebetween identified by "t". It is desirable that the joint 64 reside fully within a crest portion 74. If the end 70 of the joint 64 resides in a trough portion 76, there may be a greater tendency for rubber in the cushion rubber layer 56 to find its way into the joint end 70. This region may thus be more prone to bending fatigue, potentially leading to the early formation of cracks.

The joint 64, as noted above, preferably resides entirely within a crest portion 74. The joint 64 may be orthogonal to the plane P. While this configuration may increase the likelihood of rubber flow into the joint 64, this flow is limited due to the substantial thickness of the cog crest portion 74. Further, the flow may not extend to an extent that this phenomenon has a significant effect on the belt's resistance to bending fatigue.

The reinforcing fabric 62 has end portions 80, 82 that overlap to produce a joint at 84. In this embodiment, a free end 86 of one end portion 80 resides at a side surface 88 of the cog 54 identified at C, which side surface faces lengthwise of the belt body 42. The free end 90 of the other end portion 82 resides at a side surface 92 of the cog 54 at C facing oppositely to the side surface 88. Neither free end 86, 90 is located at a trough portion 76. One of the free ends 86, 90 may be located at an apex 94 between the side surfaces 88 92, rather than extending to the side surfaces. The apex 94 is considered herein as a common part of both side surfaces 88, 92. Because the free ends 86, 90 are both located at a side surface 88, 92 of a cog crest portion 74, there is little tendency of the free end 90 of the end portion 82 to crease, as might later be the cause of early crack formation.

Figure 2:
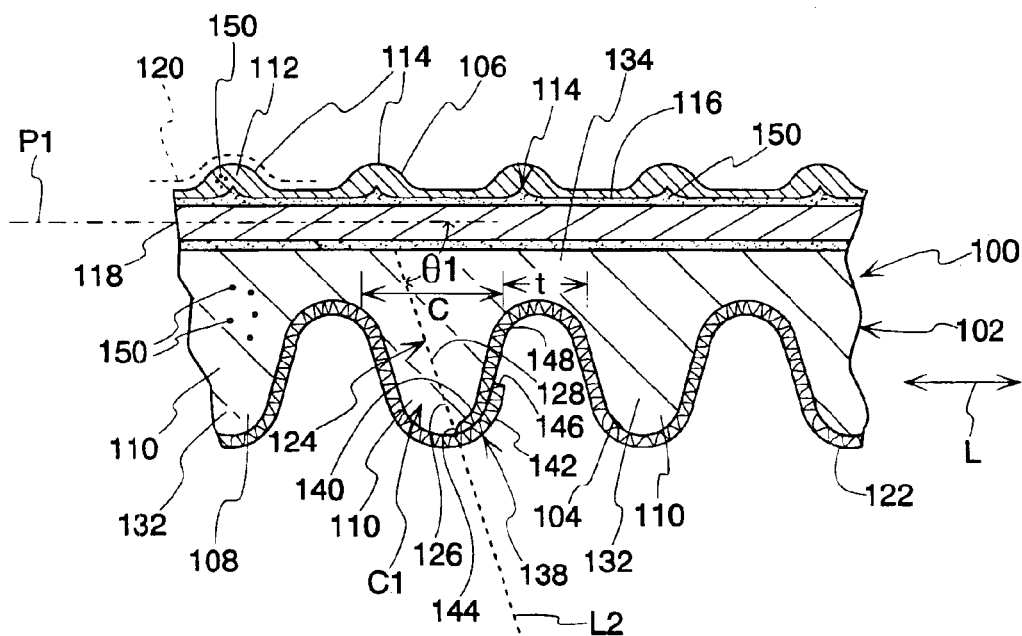
FIG. 2 is an enlarged view, as in FIG. 1, of a modified form of power transmission belt, made according to the present invention.

In FIG. 2, another form of belt is shown at 100, made according to the invention. The belt 100 has a body 102 with an inside 104 and an outside 106. The body 102 is made up of a compression rubber layer 108 on the inside of the body 102 in which a plurality of cogs 110 are formed and spaced at regular intervals along the length of the body 102, as indicated by the double-headed arrow L. A tension rubber layer 112 defines the outside of the body 102. The tension rubber layer 112 has a plurality of cogs 114 formed therein and spaced at a regular intervals along the length of the body 102. A cushion rubber layer 116 is defined between the compression rubber layer 108 and tension rubber layer 112 and has spirally wrapped load carrying cords 118 embedded therein and extending lengthwise of the body 102. The load carrying cords 118 may have the same composition and construction as the load carrying cords 58. A first reinforcing fabric layer 120 is applied to the outside of the body 102. A second reinforcing fabric layer 122 is applied to the inside of the body 102.

A joint 124 is formed in the compression rubber layer 108 where ends 126, 128 are joined in the same manner as the ends 68, 70, previously described with respect to the belt 40. A line L2 of the joint 124 makes a bias angle θ1 with a lengthwise line in a reference plane P1 through the central axes of the load carrying cords 118, preferably in the same range as for the angle θ for the belt 40.

The cogs 110 have crest portions 132 identified by "c" and trough portions 134 identified by "t", corresponding to the crest and trough portions 74, 76 on the belt 40.

The reinforcing fabric 122 has a joint 138 defined by lapped end portions 140,142 thereon. The end portion 140 has a free end 144 with the end portion 142 having a free end 146. The end portions 140, 142 overlap at the same cog 110 identified as C1 and, in this embodiment, reside fully within one side surface 148 on the crest portion 132 of the cog C1.

The free end 144 is aligned with the line L2 of the joint 124, though it need not be. This allows for a relatively short overlap length at the joint. Locating the joint 138 at the side surface 148 on the crest portion 132 of the cog 110 at C1 eliminates the cutting process, described in detail below, whereat the end of the fabric on the cog trough portion 134 next to the cog crest portion 132 is cut. This contributes to good bending fatigue resistance.

For both belts 40, 100, the rubber in the compression and tension layers 48, 108; 52, 112 may be at least one of natural rubber, butyl rubber, styrene-butadiene rubber, chloroprene rubber, ethylene-propylene rubber, alkylated-sulfonated-polyethylene rubber, hydrogenated acrylonitrile rubber; mixed polymer of hydrogenated acrylonitrile rubber and metal salts of an unsaturated carboxylic acid.

The compression and tension layers 48, 108; 52, 112 may contain short fibers 150 that may be at least one of aramid fiber, polyamide fiber, polyester fiber, and cotton fiber. The length of the fibers 150 is preferably from 1 to 10 mm, depending on the type of fibers. For aramid fibers, for example, the length preferably is 3 to 5 mm and for polyamide fibers, polyester fibers, and cotton fibers, the length preferably is 5 to 10 mm. It is preferred that the lengths of most of the short fibers 150 in the rubber layers 48, 108; 52, 112 are aligned laterally from 70–110° to a lengthwise line. Preferably this angle is 90°. The cushion rubber layers 56, 116 can also contain short fibers 150, but preferably, they do not.

The reinforcing fabric 60, 62, 120, 122 is preferably made from fibers such as cotton fibers, polyester fibers, and nylon fibers, and is a woven fabric that is formed by one of plain weaving, twill weaving, and sateen weaving. The fabric may be a wide-angle fabric having a crossing angle between warp and weft yarns of 90–120°. The reinforcing fabric 60, 62, 120, 122 is treated with an RFL solution, after which it is coated with a rubber composition by using a friction coating method to produce a fabric impregnated with rubber. The RFL solution is a solution prepared by mixing an initial polycondensate of resorcinol and formalin with latex. The latex may be chloroprene, tertiary copolymer of styrene-butadiene-vinylpyridine, hydrogenated acrylonitrile rubber and NBR.

Figure 3:
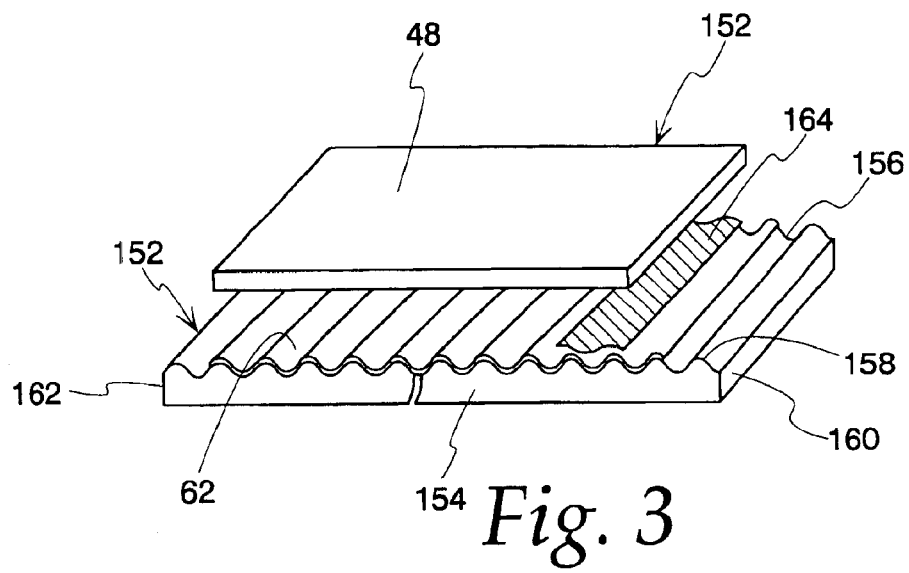
FIG. 3 is an exploded perspective view of a cog pad, consisting of a rubber layer and a reinforcing fabric used to form the belt of FIG. 1, being pressed against a mold to form cogs on the cog pad.

The method of manufacturing a double cog belt, of the type shown in FIG. 1, will now be described in detail. As seem in FIG. 3, a cog pad 152, consisting of the compression rubber layer 48, in an unvulcanized state, and the reinforcing fabric 62 is placed against a plain cogged mold 154. The mold 154 has alternating grooves 156 and projections 158 alternating between ends 160, 162 at regular intervals. The grooves 156 and projections 158 have shapes complementary to the desired shape of the cog crest and trough portions 74, 76 on the belt 40. A mold release element 164 may be interposed between the reinforcing fabric 62 and the compression rubber layer 48. The mold release element 164 may be a resin film and a sheet of mold release paper. The cog pad 152 is forced under pressure while being heated at 40–100° C. into conformity with the mold 154 to produce a belt sleeve with cog crest portions 74 and trough portions 76.

Figure 4:
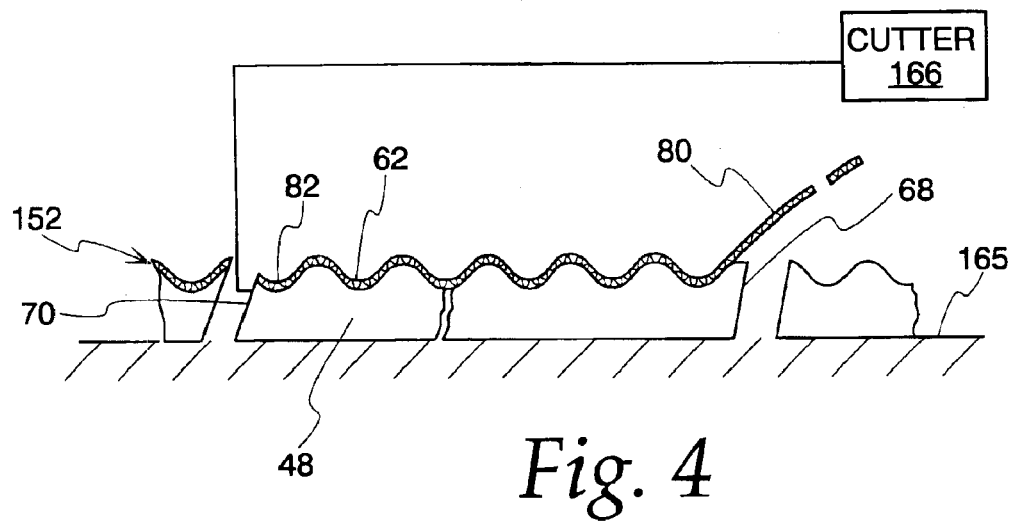
FIG. 4 is a side elevation view of the cog pad of FIG. 3 with the ends of the rubber layer and reinforcing fabric being prepared for joining.

As shown in FIG. 4, the completed cog pad 152 is placed on a surface 165 so that the cog crest portions 74 and trough portions 76 are exposed. The reinforcing fabric 62 is separated from the rubber layer 48 at the mold end 160 to allow removal of the mold release element 164. The end 68 of the cog pad 152 is severed widthwise by a cutter 166 at the top of a cog crest portion 74. The reinforcing fabric 62 is cut, as with a scissors, so that the end portion 80 extends beyond the cut end 68 of the rubber layer 48 by a length equal to the length of approximately one and one half cogs.

Figure 5:
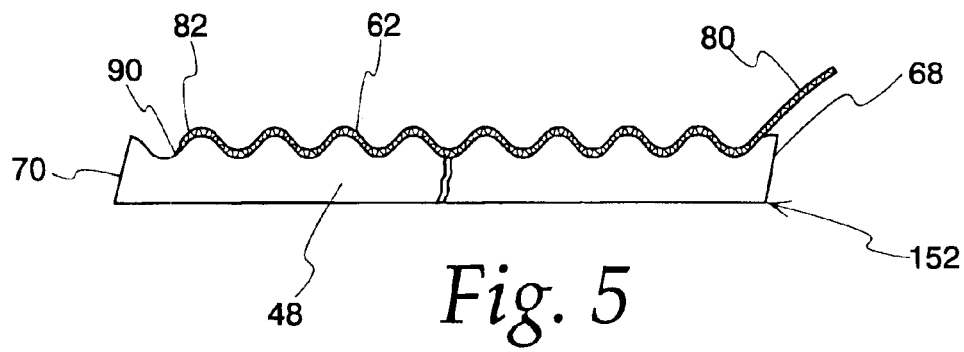
FIG. 5 is a view as in FIG. 4 with the ends of the cog pad prepared to be joined.

At the other cog pad end 70, the reinforcing fabric 62 and rubber layer 48 are severed by a cutter along the width of the cog pad 152 to form the end 70 that butts the end 68 at the joint 64. The reinforcing fabric 62 is then cut widthwise to remove a lengthwise amount equal to approximately one cog length from the end portion 82 . The free end 90 of the reinforcing fabric 62 is then separated from the rubber layer 48 to expose the rubber layer 48. The resulting structure is shown in FIG. 5.

Figure 6:
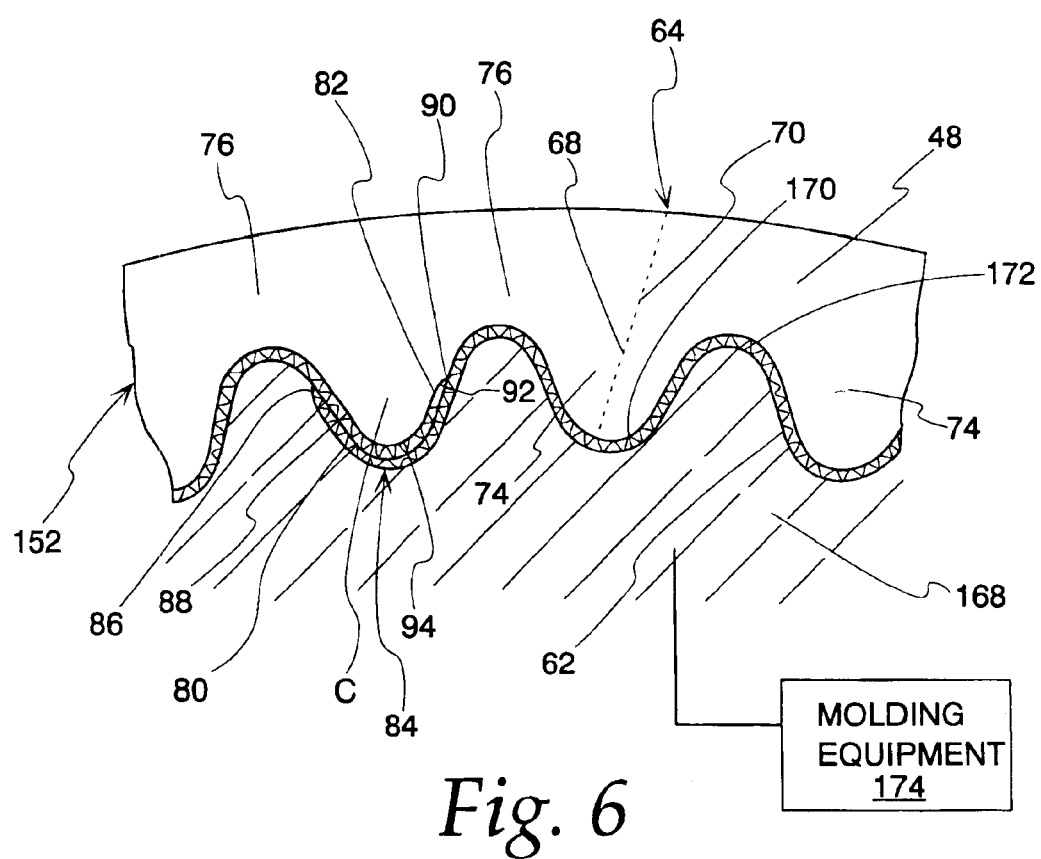
FIG. 6 is an enlarged, fragmentary, partial cross-sectional view of the cog pad of FIGS. 4 and 5 mounted on a mold and with the ends joined.

As seen in FIG. 6, the cog pad 152 is placed against a mold 168 having complementary grooves 170 and projections 172, which mold 168 is mounted on molding equipment 174. The cog pad 152 is wrapped around the mold 168 with the cog crest portions 74 and cog trough portions 76 in mesh with the grooves 170 and projections 172, whereupon the cog pad ends 68, 70 are butted to produce the joint 64. At the same time, the end portion 82 of the underlying portion of the reinforcing fabric 62 at the joint 64 is applied to the cog C so that the free end 90 is located at the side surface 92 thereof, spaced from the trough portion 76. The other end portion 80 of the overlying portion of the reinforcing fabric 62 at the joint 84 is applied over the end portion 82, wrapping around the apex 94 so that the free end 86 is located at the other side surface 88, spaced from the adjacent trough portion 76 to complete the joint 84.

Figure 8:
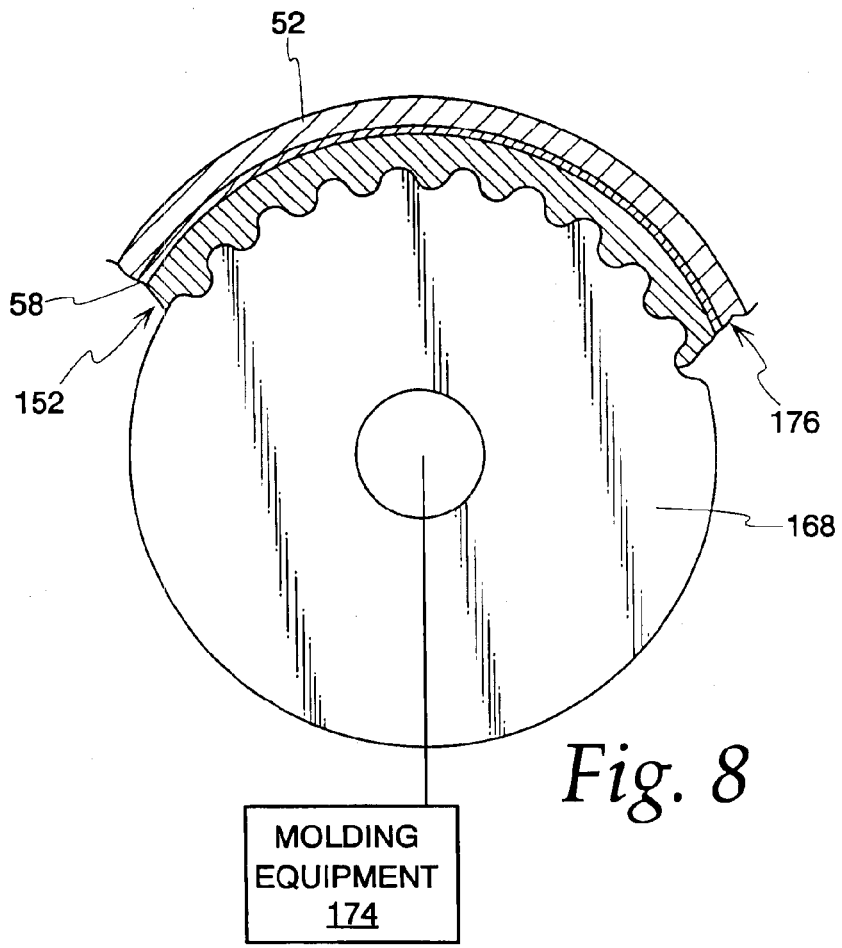
FIG. 8 is a fragmentary, cross-sectional view of the cog pad of FIGS. 3 and 4 on a mold and with additional belt components applied thereto.

As shown in FIG. 8, the load carrying cords 58 are wrapped in a spiral manner around the cog pad 152. The unvulcanized tension rubber layer 52 is then applied to define a belt sleeve preform 176. As an alternative, the mold 168 can be replaced by a conventional-type inner matrix (not shown) made from vulcanized rubber and having the same groove and projection arrangement, to be complementary to the cog pad shape.

Figure 9:
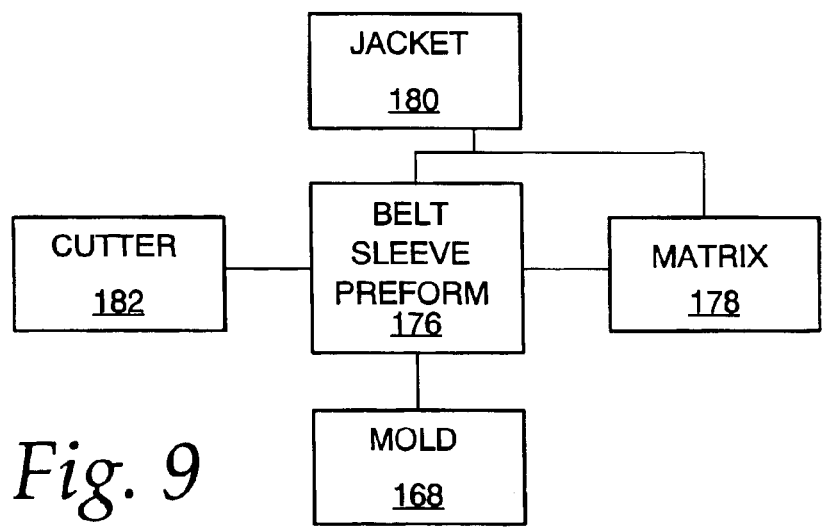
FIG. 9 is a schematic representation of the system of FIG. 8 disposed in a vulcanizing jacket.
Figure 10:
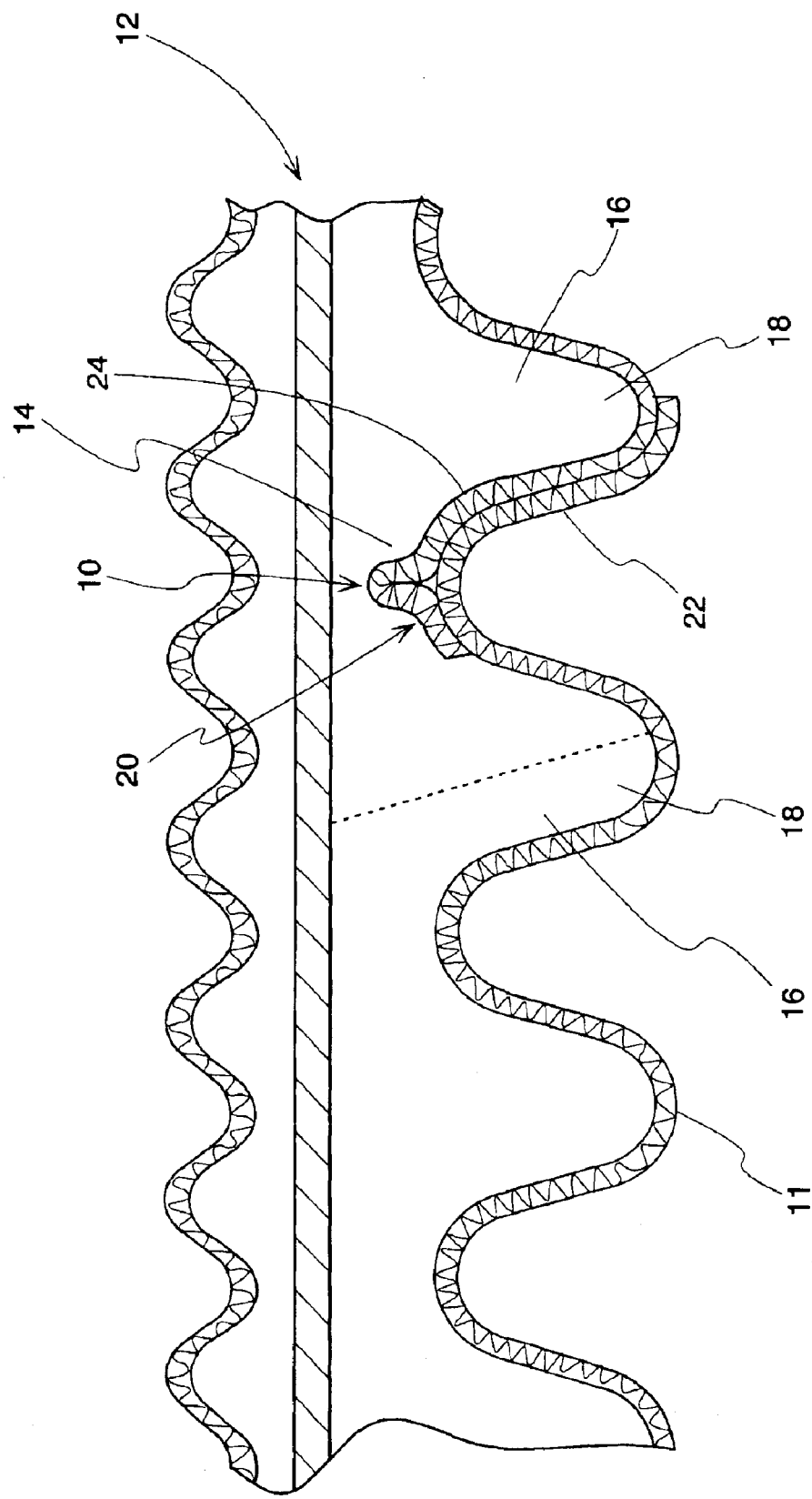
FIG. 10 is a view as in FIGS. 1 and 2 of a conventional power transmission belt.

The mold 168 and preform 176 are then separated from the molding equipment 174 and covered with a matrix 178 made of vulcanized rubber and having grooves and projections and then covered with a jacket 180 as shown in FIG. 9. The entire assembly in FIG. 9 is then vulcanized in conventional fashion. After vulcanization, the jacket 180, matrix 178, and belt sleeve preform 176 are successively separated from the mold 168. The sleeve is then cut by a cutter 182 as shown in FIG. 9 to produce individual belts 40, as shown in FIG. 1.

The method of producing the belt 100 in FIG. 2 will now be described. A cog pad 184 (FIG. 7) is made in the same manner as the cog pad 152, as described above, using the reinforcing fabric 122 and compression rubber layer 108.

The reinforcing fabric 122 is separated from the rubber layer 108 at one end of the cog pad 144 to permit separation of the mold release element 164. The rubber layer 108 is severed by the cutter 166 at the top of a cog crest portion 132 at the cog C1 to form the end 128. The reinforcing fabric 122 is cut, as by a scissors or other cutter, so that the end portion 142 of the reinforcing fabric 122 projects beyond the end 128 by a length of 2–5 mm, which is a lesser amount than for the corresponding end portion on the belt 40.

The other end portion 140 of the reinforcing fabric 122 is cut flush with the other end 128 of the rubber layer 108 at a cog crest portion 132 with the cutter 166. The cog trough portion 134 need not be exposed as with the belt 40 at the corresponding end. This may improve the belt's resistance to bending fatigue and reduce the likelihood of early crack formation at the trough portions 134. By eliminating the requirement to separate the reinforcing fabric 122 at this end, the number of manufacturing steps may be reduced over the process described previously to produce the belt 40.

Figure 7:
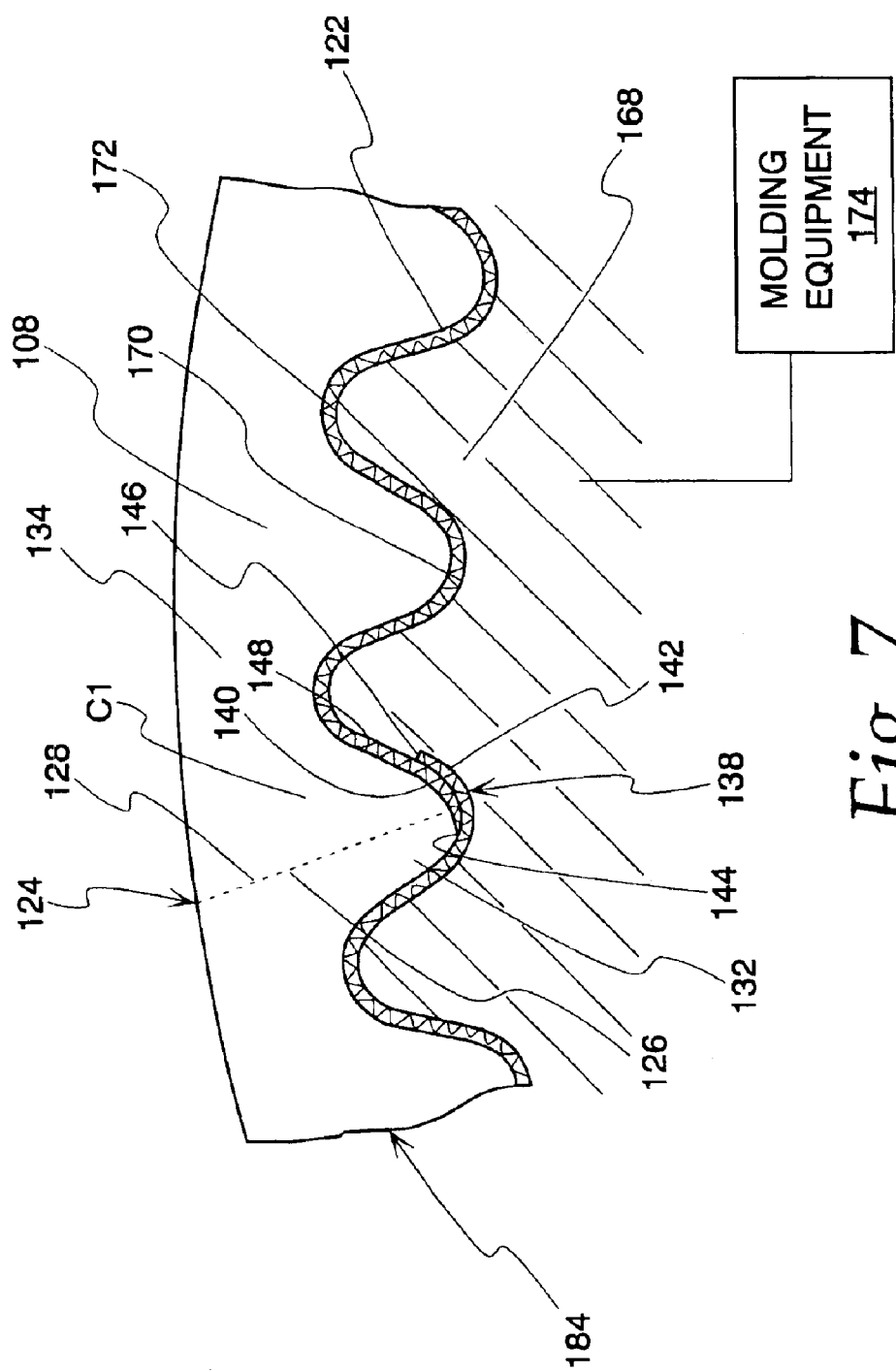
FIG. 7 is a view as in FIG. 6 with a cog pad constructed to produce the belt of FIG. 2.

As shown in FIG. 7, the cog pad 184 is placed on the mold 168 on the molding equipment 174, as previously described for the cog pad 152 with the cog crest portions 132 and trough portions 134 in mesh with the grooves 170 and projections 172. The cog pad ends 126, 128 are both butt-joined to produce the joint 124.

The end portions 140, 142 of the reinforcing fabric 12 are lapped to produce the joint 138 at which both free ends 144, 146 reside at the same side surface 148. The remaining belt components can be built up as previously described for the belt 40. In both belts 40, 100, different and/or additional belt components may be used to complete the belt.

The invention will now be described with reference to the following Inventive Examples, and Comparative Samples of belt.

INVENTIVE EXAMPLE 1

A load carrying cord was prepared by reverse twisting a primary twist and a final twist. Aramid fiber with a denier of 1500 (suitable product sold commercially under the trademark TWARON™) was twisted with 15.8 twists/10 cm for the primary twist followed by twisting with 19.7 twists/10 cm for the final twist to form a twist configuration of 2 times 3. The unprocessed cord was then pre-dipped into isocyanate adhesive, dried at 170° C.–180° C., immersed in an RFL solution, and then subjected to an elongation thermal fixing process at 200° C.–240° C.

For the reinforcing fabric, a woven fabric was formed by plain weaving with a wide weaving angle. The fabric was a mixture of aramid fiber (TWARON™) and polyethylene fiber in a weight ratio of 50:50. After immersion in an RFL solution, the fabric was subjected to a heat treatment at 150° C. for 2 minutes. A rubber composition was applied to the processed fabric by using friction coating to form a fabric impregnated with rubber.

For the compression rubber layer and the tension rubber layer, a rubber compound of chloroprene rubber containing short aramid fibers was used. The same rubber composition and fibers were used in the cushion rubber layer. Two plies of rubber sheet with different thicknesses were used to make the compression rubber layer.

A cog pad was formed by placing a laminate, consisting of a reinforcing fabric and a compression rubber layer, against a plain cogged mold having alternating grooves and projections, and pressing the laminate against the mold while being heated at 75° C.

After removing the polyethylene film on one end of the cog pad, the unvulcanized rubber sheet was bias cut widthwise at an angle of 60° at the top of a cog crest portion with a cutter, while the reinforcing fabric was cut with scissors to make the end of the reinforcing fabric project therefrom by a length approximately equal to the length of one cog from the end of the unvulcanized rubber layer.

At the other cog pad end, the reinforcing fabric and the unvulcanized rubber sheet were bias cut widthwise at an angle of 60° at the top of a cog crest portion. The reinforcing fabric was then cut widthwise along a line set back by approximately one half the length of a cog from the end of the unvulcanized rubber sheet. The end of the reinforcing fabric was then removed to expose the end of the underlying unvulcanized rubber layer.

Next, the cog pad, which was processed as described above, was wound around the surface of an inner matrix, made of vulcanized rubber, having alternating grooves and projections, and installed on a cylindrical mold. The ends of the cog pad were butt-joined to form a joint, while the end of the underlying reinforcing fabric and the end of the overlying reinforcing fabric at the joint were lapped so that the free ends thereof were located on the same side surface of a cog crest portion. The joint in the rubber layer was spaced from the cog location where the fabric was lapped by a distance equal to the length of one cog.

A load carrying cord and an unvulcanized rubber sheet, for the tension rubber layer, were then applied to define a sleeve preform. An outer matrix, made of vulcanized rubber, was then installed around the mold. A jacket was in turn installed around the outer matrix. The assembly was then inserted into a vulcanizer and processed to complete the belt sleeve. The sleeve was cut into raw edge double cog belts with angled sides, as for use on scooters.

At the overlapped part of the reinforcing fabric in this belt, the end of the inner fabric and the end of the outer fabric were located at the side surface of the same cog crest. No crease appeared at the end of the inner fabric.

The aforementioned belt was set in an upright-type belt running testing system consisting of a drive pulley, with a diameter of 85 mm, and a driven pulley with a diameter of 85 mm. A tension pulley, with a diameter of 85 mm, was pressed against the back of the belt to maintain the bending angle of the belt at 160°. The running lifetime of the belt was determined while rotating the drive pulley at 3,600 rpm, with a load of 100 kgf applied to the driven pulley. After running 144 hours, some cracks appeared at cog trough portions. No cracks were observed at the joint part.

COMPARATIVE EXAMPLE 1

In the end processing of the Comparative Example 1, the end of the reinforcing fabric was protruded, according to the method of the Inventive Example 1, by a length of a little more than one cog from the end of the unvulcanized rubber sheet. At the other end, a length of the reinforcing fabric less than one cog was removed to expose the unvulcanized rubber sheet.

Next, the processed cog pad was placed around an inner matrix installed on a mold to join the ends of the rubber layer and form the reinforcing fabric joint. At the fabric joint, the end of the underlying fabric part was located at a point beyond the bottommost part of the cog trough, while the end of the overlying fabric part was extended to a point beyond the apex of the cog crest portion to form a sufficient overlap. The belt sleeve was completed and vulcanized to produce a double cog belt.

At the joint in the reinforcing fabric of this belt, some creases appeared at the end of the underlying fabric. On the running test, described above, the outer fabric at the joint was separated after running for one our.

INVENTIVE EXAMPLE 2

This Inventive Example differs from Inventive Example 1 in the end processing of the cog pad. After removing the polyethylene film at the end of the cog pad, the unvulcanized rubber sheet was bias cut widthwise at the top of a cog crest portion at an angle of about 60°. The reinforcing fabric was severed by a cutter, and the end of the reinforcing fabric was extended by about 3 mm from the adjacent end of the unvulcanized rubber sheet. At the other end of the reinforcing fabric, the reinforcing fabric and the unvulcanized rubber sheet were bias cut widthwise at the top of a cog crest portion with a cutter at an angle of about 60°.

Next, the processed cog pad was placed around an inner matrix, having alternating projections and grooves, made of vulcanized rubber, and in turn installed on a cylindrical mold. The rubber layer ends were then butt-joined to form a joint. The free end of the underlying fabric and the free end of the overlying fabric at the joint were located at the side wall of the same cog crest portion. The joint for the rubber layer reinforcing fabric joint were formed at the same cog. The belt sleeve was completed and vulcanized as for Inventive Example 1.

No crease appeared at the end of the inner fabric.

The aforementioned belt was set in an upright-type belt running testing machine having a drive pulley, with a diameter of 85 mm, and a driven pulley, with a diameter of 85 mm. A tension pulley, with a diameter of 85 mm, was pressed against the back of the belt to maintain the bending angle thereof at 160°. The running life of the belt was determined while rotating the drive pulley at 3,600 rpm with a load of 100 kgf applied to the driven pulley. After running for 150 hours, no crack appeared at the end of the rubber layer joint.

The foregoing disclosure of specific embodiments is intended to be illustrative of the broad concepts comprehended by the invention.

What is claimed is:

1. A method of forming a power transmission belt/belt sleeve, said method comprising the steps of:
    placing a reinforcing fabric against an unvulcanized rubber layer;
    forming the reinforcing fabric and unvulcanized rubber layer against a mold surface having alternating grooves and projections to produce a cog pad having first and second spaced ends and cog crests and cog troughs alternating between the first and second spaced ends, each cog crest having oppositely facing side surfaces with an apex between the oppositely facing side surfaces;
    processing the cog pad at the first end of the cog pad so that a part of the fabric layer projects beyond the rubber layer at the first end of the cog pad;
    processing the reinforcing fabric at the second end of the cog pad to expose the rubber layer;
    joining the rubber layer at the first and second ends of the cog pad;
    overlapping the part of the reinforcing fabric at the first end of the cog pad with the reinforcing fabric at the second end of the cog pad so that a) a free end of the part of the reinforcing fabric at the first end of the cog pad is at a side surface on a crest and b) a free end of the reinforcing fabric at the second end of the cog pad is on the cog crest; and
    combining the cog pad with at least one additional component to define a power transmission belt/belt sleeve having a length.

2. The method of forming a power transmission belt according to claim 1 wherein the step of combining the cog pad with at least one other component comprises combining the cog pad with at least one cushion rubber layer and at least one load carrying cord extending lengthwise of the body and embedded in the cushion rubber layer.

3. The method of forming a power transmission belt according to claim 2 wherein the rubber layer is a compression rubber layer and the step of combining the cog pad with at least one other component comprises combining the cog pad with a tension rubber layer.

4. The method of forming a power transmission belt according to claim 1 wherein the step of joining the rubber layer comprises placing the cog pad around a mold with alternating grooves and projections and joining the rubber layer at the first and second ends with the cog pad placed around the mold.

5. The method of forming a power transmission belt according to claim 1 further comprising the step of vulcanizing the cog pad with at least one additional component.

6. The method of forming a power transmission belt according to claim 5 further comprising the step of cutting the power transmission belt/belt sleeve to define a plurality of power transmission belts.

7. The method of forming a power transmission belt according to claim 1 further comprising the step of forming the reinforcing fabric by one of a) plain weaving, b) twill weaving, and c) sateen weaving.

8. The method of forming a power transmission belt according to claim 1 wherein the step of joining the rubber layer comprises mating ends of the rubber layer at the first and second ends of the cog pad to produce a joint at a cog crest.

9. The method of forming a power transmission belt according to claim 1 wherein the step of joining the rubber layer comprises mating ends of the rubber layer at the first and second ends of the cog pad to produce a joint line that is at an angle of 60–90° to a line extending between the first and second ends of the cog pad.

10. The method of forming a power transmission belt according to claim 9 wherein the angle is between 65 and 80°.

11. The method of forming a power transmission belt according to claim 1 wherein the free end of the part of the reinforcing fabric at the first end of the cog pad and the free end of the reinforcing fabric at the second end of the cog pad are on the same side surface on the same cog crest.

12. The method of forming a power transmission belt according to claim 1 wherein the free end of the part of the reinforcing fabric at the first end of the cog pad and the free end of the reinforcing fabric at the second end of the cog pad are on different side surfaces on the same cog crest.

13. A method of forming a power transmission belt/belt sleeve, said method comprising the steps of:
    placing a reinforcing fabric against an unvulcanized rubber layer;
    forming the reinforcing fabric and unvulcanized rubber layer against a mold surface having alternating grooves and projections to produce a cog pad having first and second spaced ends and cog crests and cog troughs alternating between the first and second spaced ends, each cog crest having oppositely facing side surfaces with an apex between the oppositely facing side surfaces;
    processing the cog pad at the first end of the cog pad so that a part of the fabric layer projects beyond the rubber layer at the first end of the cog pad;
    joining the rubber layer at the first and second ends of the cog pad;
    overlapping the part of the reinforcing fabric at the first end of the cog pad with the reinforcing fabric at the second end of the cog pad so that a) a free end of the part of the reinforcing fabric at the first end of the cog pad is at a side surface on a cog crest and b) a free end of the reinforcing fabric at the second end of the cog pad is on the cog crest;

combining the cog pad with at least one additional component to define a power transmission belt/belt sleeve having a length.

14. The method of forming a power transmission belt according to claim 13 wherein the step of combining the cog pad with at least one other component comprises combining the cog pad with at least one cushion rubber layer and at least one load carrying cord extending lengthwise of the body and embedded in the cushion rubber layer.

15. The method of forming a power transmission belt according to claim 14 wherein the rubber layer is a compression rubber layer and the step of combining the cog pad with at least one other layer comprises combining the cog pad with a tension rubber layer.

16. The method of forming a power transmission belt according to claim 13 wherein the step of joining the rubber layer comprises placing the cog pad around a mold with alternating grooves and projections and joining the rubber layer at the first and second ends with the cog pad placed around the mold.

17. The method of forming a power transmission belt according to claim 13 further comprising the step of vulcanizing the cog pad with at least one additional component.

18. The method of forming a power transmission belt according to claim 17 further comprising the step of cutting the power transmission belt/belt sleeve to define a plurality of power transmission belts.

19. The method of forming a power transmission belt according to claim 13 further comprising the step of forming the reinforcing fabric to be flush with the second end of the cog pad.

20. The method of forming a power transmission belt according to claim 13 wherein the step of joining the rubber layer comprises mating ends of the rubber layer at the first and second ends of the cog pad to produce a joint at a cog crest.

21. The method of forming a power transmission belt according to claim 13 wherein the step of joining the rubber layer comprises mating ends of the rubber layer at the first and second ends of the cog pad to produce a joint line that is at an angle of 60–90° to a line extending between the first and second ends of the cog pad.

22. The method of forming a power transmission belt according to claim 21 wherein the angle is between 65 and 80°.

23. The method of forming a power transmission belt according to claim 13 wherein the free end of the part of the reinforcing fabric at the first end of the cog pad and the free end of the reinforcing fabric at the second end of the cog pad are on the same side surface on the same cog crest.

24. The method of forming a power transmission belt according to claim 13 wherein the free end of the part of the reinforcing fabric at the first end of the cog pad and the free end of the reinforcing fabric at the second end of the cog pad are on different side surfaces on the same cog crest.

* * * * *

UNITED STATES PATENT AND TRADEMARK OFFICE
CERTIFICATE OF CORRECTION

PATENT NO. : 6,962,639 B2  Page 1 of 1
APPLICATION NO. : 10/619350
DATED : November 8, 2005
INVENTOR(S) : Ito et al.

It is certified that error appears in the above-identified patent and that said Letters Patent is hereby corrected as shown below:

Column 11, line 54 should read as follows:

"pad is at a side surface on the cog crest and b) a free end of"

Signed and Sealed this

Third Day of February, 2009

JOHN DOLL
*Acting Director of the United States Patent and Trademark Office*